United States Patent
Cebollero

(10) Patent No.: US 6,561,057 B2
(45) Date of Patent: *May 13, 2003

(54) ADJUSTING DEVICE FOR CONTROL CABLES

(75) Inventor: Carlos Gabas Cebollero, Barcelona (ES)

(73) Assignee: Fico Cables, S.A., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 09/836,773

(22) Filed: Apr. 17, 2001

(65) Prior Publication Data

US 2001/0013260 A1 Aug. 16, 2001

Related U.S. Application Data

(63) Continuation of application No. 09/425,610, filed on Oct. 22, 1999, now Pat. No. 6,247,380, which is a continuation of application No. PCT/EP97/06766, filed on Dec. 3, 1997.

(30) Foreign Application Priority Data

Apr. 23, 1997 (ES) ................................................ 9700877

(51) Int. Cl.⁷ .................................................. F16C 1/10
(52) U.S. Cl. ................................ 74/502.4; 74/501.5 R; 74/502.6; 192/111 A
(58) Field of Search ........................ 74/501.5 R–502.6

(56) References Cited

U.S. PATENT DOCUMENTS

| | | | |
|---|---|---|---|
| 3,572,159 A | 3/1971 | Tschanz | |
| 4,141,117 A | 2/1979 | Van Gompel | |
| 5,448,926 A | 2/1979 | Reasoner | |
| 4,177,691 A | 12/1979 | Fillmore | |
| 4,304,322 A | 12/1981 | Beccaris | |
| 4,375,310 A | * 3/1983 | Robinson et al. | 339/88 R |
| 4,464,950 A | 8/1984 | Deligny | |
| 4,543,849 A | 10/1985 | Yamamoto et al. | |
| 4,598,809 A | 7/1986 | Glover et al. | |
| 4,693,137 A | 9/1987 | Deligny | |
| 4,751,851 A | 6/1988 | Deligny et al. | |
| 4,753,123 A | 6/1988 | Stormont | |
| 4,787,263 A | 11/1988 | Jaksic | |
| 4,813,716 A | 3/1989 | Lalikos et al. | |
| 4,887,705 A | 12/1989 | Solano et al. | |
| 4,887,930 A | 12/1989 | Chaczyk et al. | |
| 4,892,004 A | 1/1990 | Segura et al. | |
| 4,917,224 A | 4/1990 | Gokee | |
| 4,936,161 A | 6/1990 | Polando | |
| 4,955,252 A | 9/1990 | Clissett et al. | |

(List continued on next page.)

FOREIGN PATENT DOCUMENTS

| | | | |
|---|---|---|---|
| CA | 2059286 | 3/1991 | |
| EP | 0 234 814 A | 9/1987 | |
| EP | 0 342 143 | 5/1989 | |
| EP | 0 444 780 A | 9/1991 | |
| EP | 0 509 629 | 2/1992 | |
| EP | 0 517 583 | 6/1992 | |
| EP | 0 312 382 B | 11/1992 | |
| EP | 0775839 A1 | * 5/1997 | ............... 74/502.4 |
| FR | 2 677 086 | 6/1991 | |
| WO | 93/22571 | 11/1993 | |
| WO | 94/78462 | 8/1994 | |

*Primary Examiner*—Vinh T. Luong
(74) *Attorney, Agent, or Firm*—Renner, Otto, Boisselle & Sklar, LLP

(57) ABSTRACT

An adjusting device designed to adjust the length of control cables made up of two half-cables which are connected by a linking device having two exterior linking bodies and two interior linking bodies. The adjusting device includes a coaxially arranged stem provided with retaining teeth which forms one of the exterior linking bodies, a sheath terminal body, a fixing jacket and a fixing ring provided with retaining teeth. Upon rotation of the fixing jacket and fixing ring, a locking assembly is disengaged and the length of the cable may be adjusted. The adjusting device may also include a thrust sleeve and a thrust spring designed so that the adjusting device is permanently subjected to a force biased to reduce its length when unlocked.

9 Claims, 2 Drawing Sheets

U.S. PATENT DOCUMENTS

| | | |
|---|---|---|
| 5,003,838 A | 4/1991 | Pospisil et al. |
| 5,119,689 A | 6/1992 | Adams et al. |
| 5,138,897 A | 8/1992 | Beard et al. |
| 5,144,856 A * | 9/1992 | Roca .................... 74/501.5 R |
| 5,156,063 A | 10/1992 | Kelley |
| 5,161,428 A | 11/1992 | Petruccello |
| 5,222,411 A | 6/1993 | Hedstrom et al. |
| 5,265,493 A | 11/1993 | Solano et al. |
| 5,265,494 A * | 11/1993 | Gabas et al. ........... 74/501.5 R |
| 5,295,408 A | 3/1994 | Nagle et al. |
| 5,383,377 A | 1/1995 | Bolke |
| 5,485,762 A | 1/1996 | Rothman |
| 5,544,543 A | 8/1996 | Hilgert et al. |
| 5,556,224 A | 9/1996 | Niskanen |
| 5,575,180 A | 11/1996 | Simon |
| 5,655,415 A | 8/1997 | Nagle et al. |
| 5,662,004 A | 9/1997 | Osborn et al. |
| 5,839,325 A * | 11/1998 | Daumal ................. 74/501.5 R |
| 5,997,333 A * | 12/1999 | Konda et al. ............... 439/352 |
| 6,009,610 A * | 1/2000 | Brandolf ................. 29/402.03 |
| 6,119,544 A * | 9/2000 | Cebollero .................. 74/502.4 |
| 6,247,380 B1 * | 6/2001 | Cebollero .................. 74/502.6 |
| 6,263,756 B1 * | 7/2001 | Cebollero .................. 74/502.4 |

\* cited by examiner

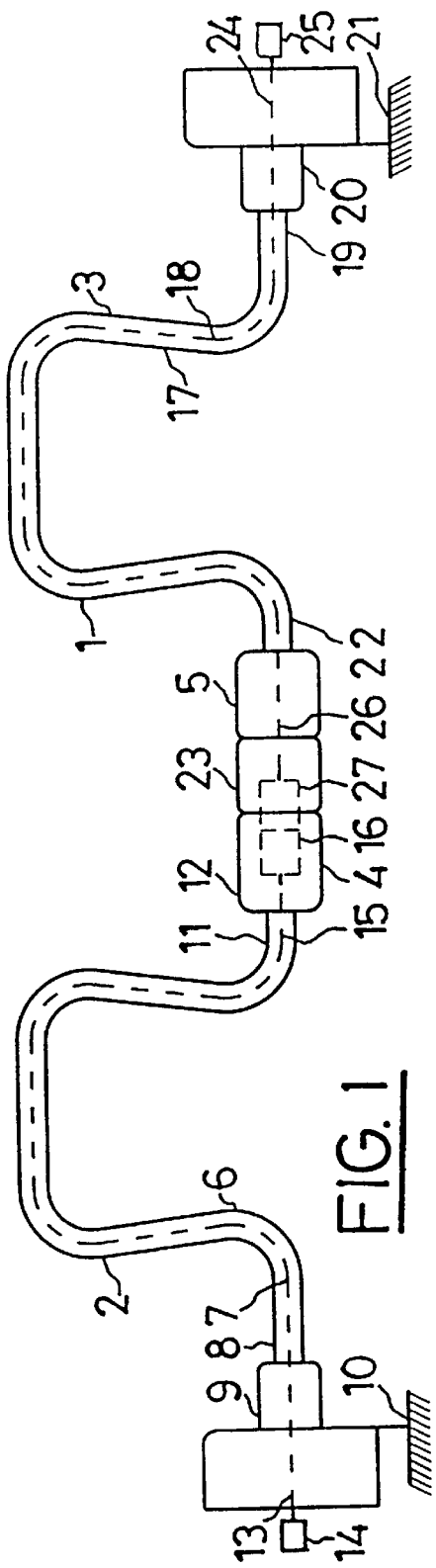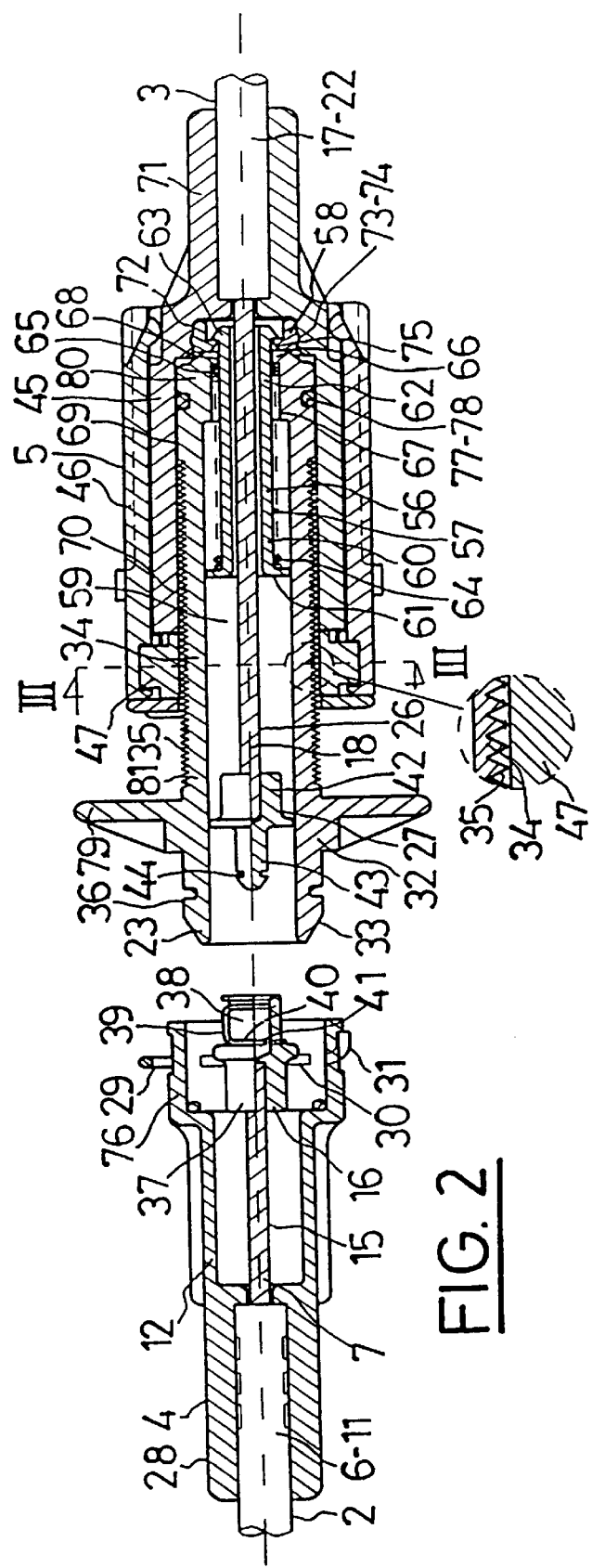

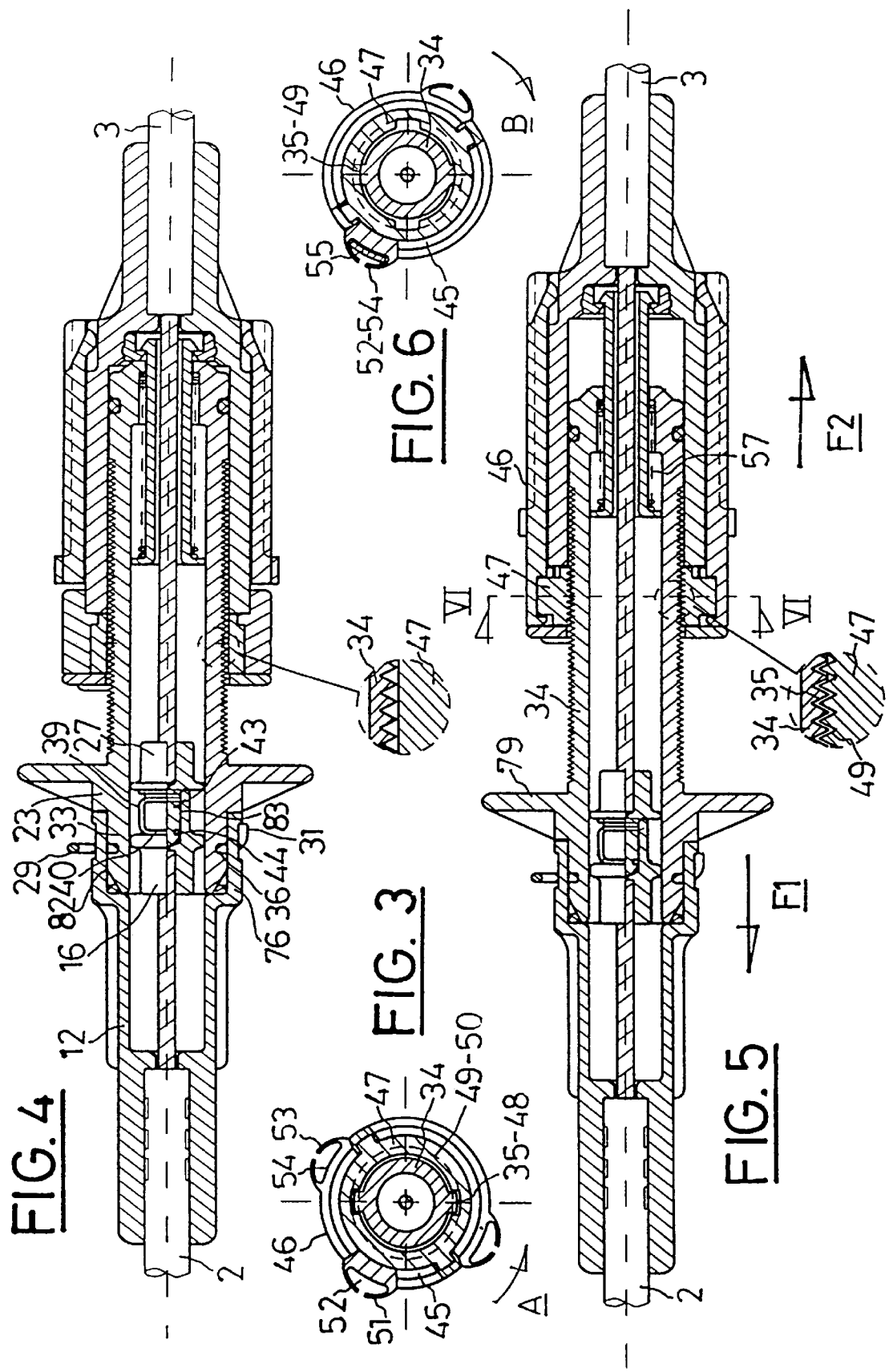

ADJUSTING DEVICE FOR CONTROL CABLES

This application is a continuation of application Ser. No. 09/425,610 filed Oct. 22, 1999, now U.S. Pat. No. 6,247,380 issued Jun. 19, 2001 which is a continuation of PCT/EP97/06766, filed Dec. 3, 1997, and which is hereby incorporated herein by reference in its entirety.

TECHNICAL FIELD OF THE INVENTION

The present invention relates to an adjusting device for control cables, which is applicable to control cables of the type made up of two control half-cables which can be linked together. More particularly, the present invention relates to an adjusting device for control cables which are habitually used in the automotive industry for the transmission of thrust/traction forces, and which are known as push-pull operating cables. Adjusting devices serve to adjust the length of the sheathed portion of the control cable once it is fitted on the vehicle.

BACKGROUND OF THE INVENTION

Known in the art are a wide variety of embodiments of control cables such as those mentioned above. Conventionally, control cables comprise an inner steel cable and an outer sheated portion. Each end of the steel cable has a respective steel cable terminal designed for linkage to an actuating control and an actuated mechanism, respectively. The ends of the sheathed portion are provided with respective sheath terminals, one or both of which are attached to fixed points of the vehicle structure.

There are some known embodiments of control cables which are formed by two control half-cables which can be linked together. These embodiments are especially indicated, for example, in cases in which the distance between the actuating control and the actuated mechanism is relatively long or in other cases in which the desired route of the control cable in the vehicle means that it has to be installed in different phases. Adjustment of the length of the sheathed portion is in any case required, in order to make the length thereof suitable for the tolerances presented by each vehicle in respect of tolerances of relative layout between the actuating control and the actuated mechanism.

In cases where the control cable is made up of two linkable half-cables, one possibility is to adjust the length of the sheathed portion of the control cable when making the linkage between the half-cables. Thus, such cables preferably have in the intermediate portion a linking device for the two half-cables, and an adjusting device coupled thereto.

SUMMARY OF THE INVENTION

In view of the above, it is the object of the present invention to provide an adjusting device for a control cable, allowing an easy and quick assembly of the control half cables and a convenient way of adjustment of the length of the outer sheated portion of the control cable to the desired length. At the same time, the adjusting device should be easy to manufacture, and thus allow an economic production thereof.

This object is solved by an adjusting device in accordance with claim 1.

In more detail, the present invention provides for an adjusting device for a control cable comprising a first control half-cable and a second control half-cable which are connectable with a linking device, the adjusting device comprising:

a. a male part;
b. a female part complimentary shaped to said male part, said male part being longitudinally insertable into said female part; and
c. locking elements to lock said male part and said female part with respect to each other at a desired longitudinal position.

According to a preferred embodiment of the present invention, the adjusting device is applicable to linking devices of two control half-cables forming a linking control cable between an actuating control and an actuated mechanism. The linking device is of the type made up of two tubular exterior linking bodies, first and second bodies respectively, which can be removably coupled together axially through linking means fitted on their facing ends, or exterior ends, and by two interior linking bodies, first and second bodies respectively, which can be removably coupled together axially through linking means fitted on their facing ends, or exterior ends, with the interior end of a first exterior linking body being attached to one of the intermediate sheath ends, with the interior end of a second exterior linking body being provided with an axial extension which forms a male part or regulating stem of the adjusting device, while the interior ends of the interior linking bodies are attached to respective intermediate ends of the steel cable, the adjusting device comprising:

a. a female part or sheath terminal body of generally long cylindrical shape provided with an axial orifice through which the steel cable of the control cable can slide in both directions, while the terminal body has at one of its ends, the interior end, means for fixing the other intermediate sheath end, the axial orifice being designed to house the regulating stem so that same can slide in both directions;

b. on the regulating stem, an axial orifice through which the steel cable of the control cable can slide in both directions, and to the exterior, some retaining teeth;

c. thrust means which bear permanently upon the regulating stem;

d. fixing means which act upon the retaining teeth of the regulating stem and fix its position on the interior of the sheath terminal body; and e. leaktightness means to prevent the ingress of liquids, dust, etc., inside the control cable.

The adjusting device according to this preferred embodiment of the invention is characterized in that the thrust means include:

f. a thrust sleeve which is traversed by the steel cable of the control cable, which sleeve has one of its ends, the interior end, attached to the terminal body through respective and complementary coupling means, while at the other end, the exterior end, it is fitted into the axial orifice of the regulating stem, with the exterior end of the thrust sleeve having a perimetral thrust projection;

g. a thrust spring coaxially mounted with respect to the thrust sleeve and working permanently under compression with one of its ends resting against the perimetral thrust projection and its other end against the regulating stem, in such a way that the stem is subjected permanently to a force bearing inwards from the outside; and h. a handhold piece on the exterior of the regulating stem.

According to another preferred embodiment, the means of coupling of the interior end of the thrust hose with the sheath terminal body may comprise a retaining bushing provided with an axial orifice fixed to the terminal body; and on the interior end of the thrust sleeve, a perimetral retaining projection so designed that the retaining bushing fits between the perimetral retaining projection and the regulating stem.

The mode of operation of the adjusting device according to the above described preferred embodiment of the invention will be now described. Once the steel cable terminals of the control half-cables have been fixed to the actuating control and the actuated mechanism respectively, the sheath ends attached to respective fixed points, and the intermediate ends of the control half-cables attached by means of the linking device, the portion of sheathed steel cable of the control cable is then adjusted by means of the adjusting device of the invention. The adjusting device is supplied ex-works with the thrust spring expanded, that is, with the regulating stem housed to the maximum extent in the axial orifice of the sheath terminal body. In order to adjust the portion of the sheathed steel cable the user holds the sheath terminal body and the handhold of the regulating stem and applies in a longitudinal direction two opposing forces in opposite directions. The application of these forces leads to a simultaneous sliding in opposite directions of the regulating stem and the sheath terminal body, in such a way that the regulating stem is moved from the inside outwards; this sliding of the stem subjects the thrust spring to greater compression by reduction of its length; the sliding of the regulating stem and of the sheath terminal body subjects both sheaths of the control half-cables to compression, and the sliding motion continues until the reactions of the control half-cables are cancelled out by said applied forces, at which moment the length of the sheathed portions is adjusted. Finally, by acting upon the fixing means of the adjusting device, the user fixes the position of the regulating stem, thereby ensuring adjustment of the control cable which is left in the correct service conditions.

The operation of the adjusting device of the invention described above results in the application of forces of opposite direction to the sheath terminal body and the handhold piece of the regulating stem, or which is equivalent, the application of such forces which are compression forces for the corresponding sheaths of the control half-cables, causes the intermediate ends of the steel cables of the control half-cables to move towards each other, and this independently of the route of the control cable, thereby ensuring the union of said steel cables ends, carried out by the control half-cables linking device, during the operation of adjustments of the sheathed portion of steel cable.

BRIEF DESCRIPTION OF THE DRAWINGS

The figures of the drawings show preferred embodiments of the adjusting device in accordance with the present invention:

FIG. 1 is a schematic representation of a control cable made up of two control half-cables provided with a linking device and an adjusting device in accordance with the present invention;

FIG. 2 is a longitudinal sectional view of a linking device and the adjusting device in accordance with the invention prior to the connection of the control half-cables;

FIG. 3 is a sectional view taken along the line III—III of FIG. 2;

FIG. 4 is a longitudinal sectional view similar to FIG. 2, but showing the linking device and the adjusting device of the invention once the control half-cables have been connected and prior to adjustment of the length of the control cable by the adjusting device;

FIG. 5 is a longitudinal sectional view similar to FIG. 2, but showing the linking device and of the adjusting device of the invention once the length the control cable has been adjusted; and FIG. 6 is a sectional view taken along the line VI—VI of FIG. 5.

DETAILED DESCRIPTION OF THE PREFERRED EMBODIMENTS

In the following, preferred embodiments of the present invention will be described. It is, however, emphasized that the preferred embodiments described below represent only examples how the inventive subject matter defined in the claims may be implemented in a particular design.

FIG. 1 shows schematically a control cable 1 made up of a first control half-cable 2, a second control half-cable 3, a half-cable linking device 4, and an adjusting device 5 according to the present invention.

The first control half-cable 2 comprises an outer or exterior sheath 6, and a inner cable 7, which is preferable a steel cable. One of the ends of the sheath 6, the one marked with reference number 8, is attached to a sheath terminal 9, which is in turn attached to a fixed point 10 within the structure of the automobile vehicle. The other end of the sheath 6, the one marked with reference number 11, is attached to a first exterior linking body 12 of the linking device 4.

The first one of the ends of the steel cable 7, the one marked with reference number 13, is attached to a steel cable terminal 14 which can be coupled, for example, to an actuating control (not shown). The other end of the steel cable 7, which is marked with reference number 15, is attached to a first interior linking body 16 of the linking device 4.

Similarly, the second control half-cable 3 comprises a sheath 17 and a steel cable 18. One of the ends of the sheath 17, the one marked with reference number 19, is attached to a sheath terminal 20, which is, in turn, attached to a fixed point 21 of the structure of the automobile vehicle. The other end of the sheath 17, the one marked with reference number 22, is attached to the adjusting device 5 which is coupled to a second exterior linking body 23 of the linking device 4.

On the other hand, one of the ends of the steel cable 18, the one marked with reference number 24, is attached to a steel cable terminal 25 which can be coupled, for example, to an actuated mechanism (not shown), while the other end of the steel cable 18, which is marked with reference number 26, is attached to a second interior linking body 27 of the linking device 4.

It is emphasized, that the control cable arrangement described above may vary depending on each specific case of the application, without affecting the essential nature of the invention.

In the following description of the adjusting device of the invention, reference is made particularly to FIGS. 1, 2 and 3. The remaining FIGS. 4, 5 and 6 refer to different phases of coupling of the half-cables, and to the operation of the adjusting device 5 of the invention.

FIG. 2 shows in detail the half-cable linking device 4 and the adjusting device 5 of the invention in a position prior to that of linking of the control half-cables 2, 3.

FIG. 2 shows how the first exterior linking body 12 is of generally hollow cylindrical shape open at both its ends, interior end 28 and exterior end 76 respectively. It is traversed by the steel cable 7 of the control half-cable 2, with the end 11 of the sheath 6 of the first control half-cable 2 being fixed to the interior end 28. On the exterior end 76 there are linking means which include a locking means in the form of a fixing spring 29 which is generally U-shaped, and transverse openings 30 which are traversed by the arms 31 of the spring 29.

The second exterior linking body 23 is of generally hollow cylindrical shape and is open at both of its ends, interior end 32 and exterior end 33 respectively. It is traversed by the steel cable 18 of the control half-cable 3, with the interior end 32 running axially and forming a male part in the form of a regulating stem 34, on which two ends can be distinguished, namely interior end 80 and exterior end 81. The stem 34 is provided with an axial orifice 59 which is traversed by said steel cable 18, and the stem having to the exterior a screw-threaded retaining section 35. On the exterior end 33 of the second exterior linking body 23 there is a perimetral groove 36 designed to receive the arms 31 of the spring 29 of the first exterior linking body 12.

The first interior linking body 16 has a generally cylindrical shape and is at one of the ends, the interior end 37, fixed the end 15 of the steel cable 7 of the control half-cable 2. The other end, the exterior end 38, has a generally complex shaped fixing spring 39 whose arms 40 traverse corresponding transverse grooves 41.

The second interior linking body 27 has a generally cylindrical shape and is at one of the ends, the interior end 42, fixed the end 26 of the steel cable 18 of the control half-cable 3. The other end, the exterior end 43, has a perimetral groove 44 designed to receive the arms 40 of the fixing spring 39 of the first interior linking body 16.

FIGS. 2 and 3 show how the adjusting device 5 includes, in addition to the above-mentioned male part or regulating stem 34, a female part or sheath terminal body 45, which is provided with an axial through-orifice 69 designed to receive the stem 34 with a snug fit, and locking elements for fixing the position of the stem 34 within said axial orifice 69. The locking elements include a tubular fixing jacket 46 and a fixing ring 47 attached to each other and able to rotate in both directions around the terminal body 45.

The sheath terminal body 45 is of generally long cylindrical shape. On one of its ends, the exterior end 70, the fixing jacket 46 and the fixing ring 47 are coaxially arranged, while the other end, the interior end 71, is fixed to the end 22 of the sheath 17 of the control half-cable 3.

FIG. 3 shows in cross-section how the screw-threaded portion 35 of the stem 34 consists of two equal longitudinal portions 48 arranged diametrically opposite to each other. The interior of the fixing ring 47 has a screw-threaded retaining portion 49 which consists of two equal longitudinal portions 50 arranged diametrically opposite each other to coincide with the portions 48 of the stem 34, in such a way that when the two screw-threaded portions are disengaged, as shown in FIGS. 2, 3 and 4, the regulating stem 34 can slide longitudinally in both directions. FIG. 6 shows how the rotation of the fixing jacket 46 in the direction marked A in FIG. 3 gives rise to meshing of the retaining teeth 35, 49 of the stem 34 and of the retaining ring 47 respectively, in such a way that the position of the stem 34 is fixed with respect to the sheath terminal body 45. Moreover, to ensure the position of the fixing ring 47, once both screw-threaded portions 35, 49 have engaged with each other, FIG. 3 shows how the sheath terminal body 45 has two elbowed transverse projections 51 which form a longitudinal cavity 52, and the fixing jacket 46 has two corresponding elbowed transverse projections 53 which form a longitudinal cavity 54; thus positioned, FIG. 6 shows how once both screw threaded sections 35, 49 are engaged with each other, both longitudinal cavities 52, 54 are left facing each other, in such a way that fitting of through-pin 55 in said cavities 52, 54 prevents rotation of the fixing jacket 46.

The above-described arrangement is used in embodiments of control half-cable linking devices fitted with a device for adjusting the length of the portion of sheathed steel cable, once said half-cables have been linked to each other.

FIG. 2 shows how the adjusting device 5 of the invention has thrust means which include a thrust sleeve 56, a thrust spring 57 and a retaining bushing 58 fixed to the sheath terminal body 45. The thrust sleeve 56 is traversed by the steel cable 18 of the control half-cable 3; one of the ends of the sleeve 56, the exterior end 60, is fitted in the axial orifice 59 of the stem 34 and has a perimetral thrust projection 61, while the other end, the interior end 62, projects from the stem 34 at its interior end 80 and has a perimetral retaining projection 63 of truncated-cone outline with its smaller base oriented outwards. The thrust spring 57, which is coaxially mounted with respect to the sleeve 60, works permanently under compression with one of its ends, the exterior end 64, resting against the perimetral thrust projection 61 of the stem 34 and its other end, the interior end 65, resting against a seat 66 formed in the axial orifice 59 of the stem 34 by the linkage of two cylindrical portions of different diameters, a first portion 67 and a second portion 68 of smaller diameter respectively, with the second cylindrical portion 68 being traversed with a snug fit by the interior end 62 of the thrust sleeve 56. The retaining bushing 58 has a generally U-shaped longitudinal section and is fixed to cylindrical portion 72 of smaller diameter of the axial orifice 69 of the sheath terminal body 45, said fixing being implemented through respective and complementary coupling means which include, on said cylindrical portion 72, a perimetral retaining groove 73, and on the retaining bushing 58 a perimetral retaining projection 74, so designed that the coupling of the bushing 58 is implemented under pressure, the bushing 58 having an axial retaining orifice 75 whose longitudinal cross-section has an outline of generally truncated-cone shape with its larger base oriented outwards, to coincide with the perimetral retaining projection 63 of the thrust sleeve 56. The thrust means described above are designed in such a way that, once they are coupled to each other and to the regulating stem 34 and sheath terminal body 45, the retaining bushing 58 is positioned between the perimetral projection 63 of the interior end 62 of the thrust sleeve 56 and the regulating stem 34, and the thrust spring subjects the regulating stem 34 to a force directed from the outside inwards. Moreover, the thrust means have a handhold 79 of generally circular crown shape fitted on the interior end 32 of the second interior linking body 23.

FIG. 2 shows how the regulating stem 34 has on its exterior part a perimetral groove 77 designed to take a gasket 78 to prevent the ingress of dust, liquids, dirt, etc. into the control half-cable 3, which ingress could affect its functioning.

There follows a description of the operation of the example of embodiment of the adjusting device of the invention for control cables.

The adjusting device 5 is supplied ex-works as shown in FIG. 2, that is, with the thrust spring 57 expanded and the regulating stem 34 occupying its innermost position in the sheath terminal body 45.

Once the control half-cables 2, 3 have been fitted as shown in FIG. 1, that is, with the steel cable terminals 14, 25 attached to an actuating control and an actuated mechanism respectively, and with the sheath terminals 9, 20 attached to respective fixed points 10, 21 of the vehicle structure, the two half-cables 2, 3 are linked to each other by means of the linking device 4, which linkage consists in the coupling together of the first 12 and second 23 exterior linking bodies of the linking device 4, as shown in FIG. 4, this coupling being carried out by inserting the exterior end 33 of the second exterior linking body 23 into a cavity 82 in the exterior end 76 of the first exterior linking body 12, in such a way that the arms 31 of the fixing spring 29 of the first exterior body 12 are housed in the perimetral groove 36 of the second exterior body 23; simultaneously with coupling of the exterior linking bodies 12, 23, the first 16 and second 27 interior linking bodies are coupled together, this coupling being carried out by inserting the exterior end 43 of the second interior linking body 27 into a cavity 83 in the first interior linking body 16, in such a way that the arms 40 of the fixing spring 39 of the first interior body 16 are housed in the perimetral groove 44 of the second interior body 27.

Once the control half-cables 2, 3 have been coupled in the manner described, the length of the sheathed steel cable portion 6–7, 17–18 of the control cable 1 is adjusted by means of the adjusting device 5 of the invention. To carry out this adjustment, FIGS. 5 and 6 show how the user has simply to carry out the following operations:

1. First, while holding the handhold 79 and the tubular fixing jacket 46, subjecting them to respective axial forces F1, F2 in opposite directions as shown in FIG. 5, the application of these forces F1, F2 causing the regulating stem 34 to slide outwards to the extent needed for adjustment of said portion of sheathed steel cable 6–7 and 17–18, during which sliding movement the thrust spring 57 is subjected to greater compression by reduction of its length.
2. Then, keeping forces F1, F2 applied, a rotation of the tubular fixing jacket 46 in the direction marked A in FIG. 3 follows, sufficiently to engage the retaining screw-threads 35, 49 of the regulating stem 34 and of the fixing ring 47 respectively as shown in FIG. 6, leaving the position of the stem 34 fixed with respect to the sheath terminal 45, at which moment the user ceases to apply forces F1, F2.
3. Finally, the through-pin 55 is situated in cavities 52, 54 of the sheath terminal body 45 and the fixing jacket 46 respectively, thereby ensuring the engaged position of the retaining screw-threads 35, 49.

If for any reason it should prove necessary to go back to the initial working position of the adjusting device 5 of the invention, the user has simply to withdraw the through-pin 55 from its inserted position and then rotate the tubular fixing jacket 46 in the direction marked B in FIG. 6 to cause disengagement of the retaining screw-threads 35, 49. Then the reaction of the thrust spring 57 will drive the regulating stem 34 inwards to leave the device in the initial position and ready to begin a new control cable 1 adjustment procedure.

The described functioning of the adjusting device 5 of the invention therefore provides a solution to the problems indicated above which are presented by the known embodiments of self-adjusting devices for adjusting the length of the portions of sheathed steel cable 6–7 and 17–18 of the control cable 1. Indeed, the application of the forces F1, F2 and the action of the thrust spring 57 of the adjusting device of the invention impart on the sheaths 6, 17 of half-cables 2, 3 a compressing action which causes adjustment of the length of the sheathed portions 6–7, 17–18 and the consequent bringing together of the intermediate steel cable ends 15, 26, thereby ensuring that they are linked by the linking device 4 and preventing said ends 15, 26 separating accidentally, as occurs under certain circumstances with the known embodiments of self-adjusting devices.

What is claimed is:

1. A control cable comprising:
    two control half-cables, wherein each of said control half-cables include an interior cable surrounded by an exterior sheath, wherein each said interior cable is able to longitudinally slide in both directions inside said respective exterior sheath;
    a linking device including two interior linking bodies and two exterior linking bodies, wherein said two interior linking bodies are capable of connecting and disconnecting said two interior cables and said two exterior linking bodies are capable of connecting and disconnecting said two exterior sheaths, and
    an adjusting device; said adjusting device including:
        a female part attached to an exterior sheath of a first one of said control half-cables,
        a male part attached to a first one of said exterior linking bodies, said male part being complementary shaped to said female part and being longitudinally insertable into said female part, and
        locking elements to lock said male part and said female part with respect to each other at a desired longitudinal position.

2. The adjusting device according to claim 1, further comprising a seal preventing the entry of any foreign substance inside said control cable.

3. The control cable according to claim 1, wherein said locking elements of said adjusting device further comprise:
    a tubular fixing jacket able to rotate in both directions around said female part;
    a fixing ring able to rotate in both directions around said female part and being attached to said fixing jacket; and
    wherein said male part and said female part have complimentary retaining portions which may assume an engaged position and a disengaged position, depending on the rotational position of said fixing ring with respect to said male part.

4. The adjusting device according to claim 3, further comprising a seal preventing the entry of any foreign substance inside said control cable.

5. A control cable comprising:
    two control half-cables, wherein each of said control half-cables include an interior cable surrounded by an exterior sheath, wherein each said interior cable is able to longitudinally slide in both directions inside said respective exterior sheath;
    a linking device including two interior linking bodies and two exterior linking bodies, wherein said two interior linking bodies are capable of connecting and disconnecting said two interior cables and said two exterior linking bodies are capable of connecting and disconnecting said two exterior sheaths, and
    an adjusting device; said adjusting device including:
        a male part,
        a female part complementary shaped to the male part, wherein said male part is capable of being longitudinally inserted into said female part, and
        locking elements to lock said male part and said female part with respect to each other at a desired longitudinal position, and wherein the adjusting device includes a thrust portion connected with said male part and said female part in such a way that said male part and said female part are forced to axially move toward each other whenever said locking elements are in the unlocked state.

6. The control cable according to claim 5, wherein said locking elements of said adjusting device further comprise:

a tubular fixing jacket able to rotate in both directions around said female part;

a fixing ring able to rotate in both directions around said female part and being attached to said fixing jacket; and wherein said male part and said female part have complimentary retaining portions which may assume an engaged position and a disengaged position, depending on the rotational position of said fixing ring with respect to said male part.

7. The control cable according to claim 6, further comprising a seal preventing the entry of any foreign substance inside said control cable.

8. The control cable according to claim 6, wherein said locking elements of said adjusting device further comprise a securing portion locking said fixing jacket and said female part in said engaged position.

9. The adjusting device according to claim 5, further comprising a seal preventing the entry of any foreign substance inside said control cable.

\* \* \* \* \*